Nov. 30, 1965   N. E. ANDERSON   3,220,629
TORCH CARRIAGE

Filed March 26, 1963   2 Sheets-Sheet 1

INVENTOR.
NELSON E. ANDERSON
BY John W. Gaines
His Attorney

Nov. 30, 1965     N. E. ANDERSON     3,220,629
TORCH CARRIAGE

Filed March 26, 1963     2 Sheets-Sheet 2

INVENTOR.
NELSON E. ANDERSON
BY
John W. Gaines
His Attorney 3,220,629
TORCH CARRIAGE
Nelson E. Anderson, Berkeley Heights, N.J.; Severa B. Anderson, administratrix of said Nelson E. Anderson, deceased, assignor to Air Reduction Company, Incorporated, New York, N.Y., a corporation of New York
Filed Mar. 26, 1963, Ser. No. 268,014
13 Claims. (Cl. 228—25)

This invention relates to welding apparatus, and more particularly to a torch carriage for supporting and guiding a welding torch adjacent to work along which a continuous weld is to be performed. Apparatus of this type is of particular utility in connection with relatively large structures, such for example as fluid-housing tanks of high capacity; it ordinarily takes the form of a track temporarily supported in spaced relation to the work and a torch carriage movable along that track.

Such apparatus presents only limited problems when the path of the track is straight or of such a large radius that over any limited-length portion it is essentially straight. There are, however, many cases in which that path, although lying generally along a plane (for example, a horizontal plane), nevertheless contains portions which are curved along (i.e., as seen in FIGURES 1 and 3) that plane—for example, as a result of convexities or concavities of the work surface—with relatively short radii. In such cases the problems presented by the apparatus have become serious, and if the radii of curvature involved become as small as several feet the use of the apparatus may not even be attempted.

The problems have to do with the coaction of the bearing, guiding and driving means of the carriage with the track in the curved portions of the latter. Such means are usually rollers—some typically smooth-faced for engagement with a smooth track surface, and others typically in the form of pinions for engagement with a track surface which constitutes a rack. In the case of the former even modest deviations of the orientation of the roller axis from ideal result at the least in jumpiness or jerkiness of the carriage movement which seriously impairs the smoothness and excellence of the weld meanwhile being performed, while in the case of the latter such deviations will result in jamming resulting in outright inoperability—and serious such deviations occur, at track portions of substantial curvature, with apparatus which for essentially straight-track use is eminently satisfactory.

It is an object of the invention to provide apparatus of the general character indicated which will operate wholly satisfactorily on a track whose path along the general plane of the track is substantially curved.

Tool carriages which are arranged to be held on the track positively rather than merely by gravity—for example, because the track may be disposed along a vertical or near-vertical plane—present more serious problems by reason of the increase in number of rollers or the like which they require. It is an object of the invention to provide apparatus which will operate as last above outlined even though the torch carriage is thus positively held on the track.

In accordance with a rather general aspect of the invention the torch carriage is in the form of a train of two members pivotally interconnected on an axis generally normal to the abovementioned plane. In accordance with one more particular aspect each of the members includes a respective single bearing roller which is journalled on a transverse axis fixed in that member and which peripherally bears on the bearing surface of the track, and those members are appropriately guided, independently of the bearing rollers, to maintain the axis of each of those rollers substantially normal to the track's path (more precisely, to the projection of that path at right angles to the abovementioned plane) in spite of curvatures of the path. In accordance with an allied aspect there is carried in the train a track-engaging means rotatable to propel the train and torch along the track, and the guiding of the two members of the train also maintains the axis of that means in the substantially normal relationship mentioned above in connection with the bearing rollers. In accordance with still a different particular aspect the train is provided with longitudinally spaced means (for example, the bearing rollers previously mentioned) bearing on the track's bearing surface, with a roller engaging the opposite surface of the track, and with means supporting that roller in a longitudinally intermediate position in the train yet with the roller axis in the substantially normal relationship mentioned above. In connection with the last-mentioned aspect there is advantageously employed in the train, for the support of the roller last discussed, a supplementary member connected between the two main members of the train in straddling relationship to the axis of their pivotal interconnection.

Various objects of the invention have already been made apparent. Allied and other objects will appear from the following detailed description and the appended claims.

In the detailed description of the invention hereinafter set forth reference is had to the accompanying drawings, in which.

Reference may first be had to FIGURES 1 through 4 for a showing of the track 1. This may be in the form of a continuous strip of rectangularly cross-sectioned metal of which one of the narrow faces, designated as 2, lies generally along a plane and forms the bearing surface of the track—e.g., the surface on which appropriate elements of the train will be principally supported. As shown in the particularly illustrated embodiment the surface 2 lies generally along a horizontal plane, thus forming the top surface of the track. The two wide surfaces of the track, being the side surfaces in the illustrated embodiment, are designated as 3 and 4, 3 being hereinafter referred to as a guiding surface; the narrow surface 5 opposite to the bearing surface 2, being the bottom surface in the illustrated embodiment, is hereinafter more particularly dealt with.

Figure 4:
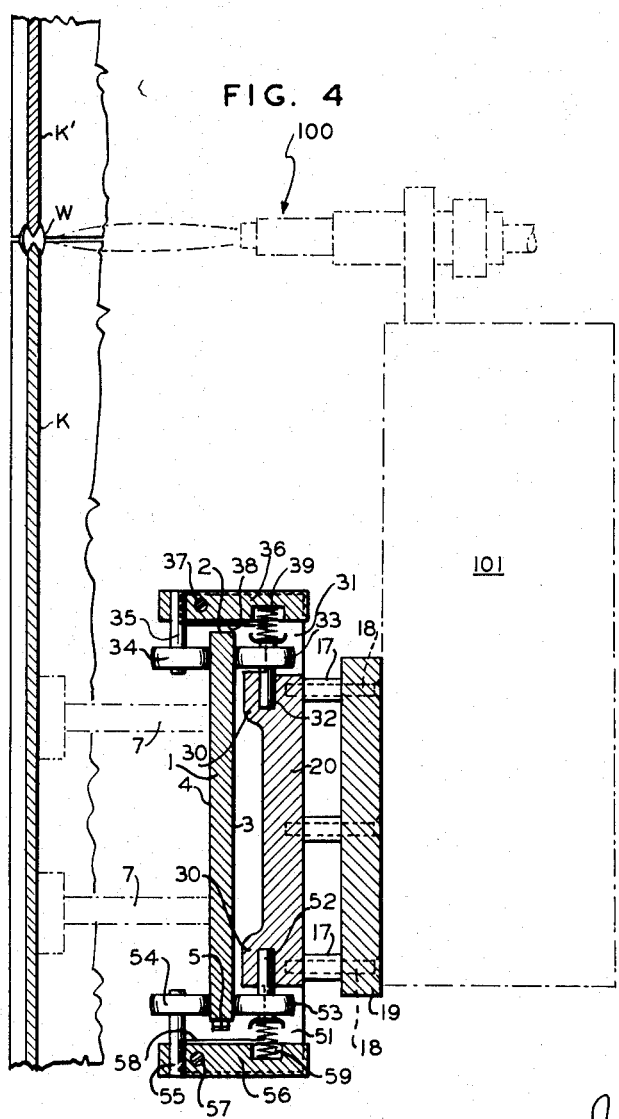
FIGURE 4 is a cross-sectional view taken along the vertical line 4—4 of FIGURE 2, omitting elements to the right of the line A—A of that figure, showing also the torch and the work and showing (schematically only) the torch-mounting means and the means which holds the track to the work.

The track is shown (see FIGURE 4) as supported in spaced relation to the surface of work K along which a continuous weld is to be performed, with its bearing surface 2 parallel to the course of that weld; thus for example FIGURE 4 shows the weld W to be performed as a butt weld, whose course is horizontal, of the top edge portion of the work K to the bottom edge portion of an initially separate workpiece K'. The support of the track to the work, which will of course ordinarily be a temporarily support only, may be by any convenient means (which for example may include rugged suction cups collapsed against the work surface) which have been shown, schematically only, as 7 in FIGURE 4.

The invention, although usable generally, is particularly concerned with the case wherein at least parts of the track along the plane mentioned above are curved (as distinguished from the case of a path rectilinear throughout its entire length); accordingly FIGURES 1 through 4 illustrate the part of the track included in them as following a path which is curved along the horizontal plane —by way of specific example, a path which is concave as viewed looking toward the work K, although it will be understood that other portions of the same track may be convex (and still others straight). It will of course be understood that the track will have been formed of metal which will permit such curvature, and in turn that the curvature of the path will ordinarily be that curvature which is necessary to keep it is nearly as possible equidistant from a curved work surface (such as has been indicated in FIGURE 4).

It will be convenient to appreciate and to bear in mind that when the path along the plane is curved, so likewise will be the geometrical projection of that path at right angles to the plane (that projection being an imaginary "wall" in effect coinciding with the track as above described and with imaginary upward and downward continuations of that track).

The train arranged for travel along the track and contemplated by the invention may comprise two members respectively designated as 20 and 60 and respectively shown (in FIGURES 1 through 3) as the left and the right of the two members. Basically each of them may be a moderately thick rectangular plate disposed, when the plane along which the bearing surface 2 lies, is a horizontal one, along a vertical plane, which plane in turn extends generally along the track with some spacing from that side surface 3 of the track which faces away from the work.

Near the left- and right-shown extermities of the member 20 (see FIGURE 1) the top and bottom parts of that member may be provided with portions locally thickened toward the track, those left-shown portions being designated as 30 and those right-shown portions as 40. Between the upper and lower portions 40 the member 20 may be cut away from its right-shown edge to a line 21 just to the left of those portions. Into the cut-out thus formed there may loosely fit the left-shown portion of the member 60, whose left-shown upper and lower corners will be cut away appropriately for the purpose. At its left-shown end the member 60 may be provided with a portion 70 locally thickened toward the track. Vertically through the portions 40 and the portion 70 (which portions will be suitably bored for the purpose) there may extend an elongated pin 42 which then pivotally interconnects the adjacent extremities (right-shown of 20, left-shown of 60) of the members on an axis which is transverse to the track and is generally normal to the horizontal plane along which the path of the track extends. In order that the members 20 and 60 may be interconnected without play along the pin 42, appropriate means such as washers 42' encircling that pin may be interposed between the members.

Each of the members 20 and 60 may be provided with a single element bearing on the track surface 2 and, at least when that surface extends (as shown) along a horizontal plane, furnishing the principal support of the train. Preferably each of these elements is a respective roller journalled on a respective transverse axis generally parallel with the plane along which the surface 2 extends and peripherally bearing on that surface. Accordingly each of the members 20 and 60 is provided at its top with a respective roller 25 or 65 peripherally bearing on that track surface; the manner in which this provision is carried out is more detailedly set forth hereinafter.

For establishing the transverse positions of the extremities of the members 20 and 60 in the plane along which the surface 2 extends there may be employed three guiding elements, respectively adjacent the interconnected member extremities and the other two member extremities, coacting with the track and more specifically engaging its guiding surface 3. Each of these three guiding elements may comprise a respective guiding roller having associated therewith a respective biasing roller (which engages the track's side surface 4) in a mutual arrangement which may be described (with reference to FIGURES 1, 2, and 4) in detail for the case of that guiding element which is adjacent the left-shown extremity of the member 20.

The top locally thickened portion 30 of the member 20 may be cut away from the top of that member for a substantial distance downwardly to form a cut-out 31, and from the portion 30 therebelow there may extend for a short distance upwardly into that cut-out a vertical pin 32; on that pin there may be journalled a guiding roller 33 whose periphery may be in contact with the guiding surface 3. To provide for an associated biasing roller 34 whose periphery will be in contact with the track's side surface 4 there may extend from the member 20 at the two sides of the cut-out 31, over and spaced slightly from the track 1, a pair of arms or lugs 38, between which just beyond the track there may be secured a cross-pin 37; on this pin there may be pivoted a lever 36 whose longer arm extends to within the cut-out, and from whose shorter arm a vertical pin 35 may extend downwardly for a short distance. On this pin 35 the biasing roller 34 may be journalled. A spring 39 compressed between the longer lever arm and a suitable cup secured on the top of the pin 32 may serve to bias the lever and thus to bias the roller 34 so that its periphery will be maintained in contact with the track's surface 4 and the periphery of roller 33 in contact with the track's guiding surface 3.

To provide for that guiding element which is adjacent the interconnected extremities of the members 20 and 60 the top locally thickened portion 40 of the member 20 may be cut away to form a cut-out 41 similar to the cut-out 31 into which the member-interconnecting pin 42 may extend for a short distance upwardly in full analogy (within the cut-out) to the pin 32 in cut-out 31; on the thus-extending portion of the pin 42 there may be journalled a guiding roller 43 analogous to the guiding roller 33. A biasing roller 44, analogous to 34, may be provided for in manner analogous to that just detailed for 34, the parts being in each instance identified by a number greater by 10 than the parts above described for 34.

Near the right-shown extremity of the member 60 (see FIGURE 1) the top part of that member may be provided with a portion 80 locally thickened toward the track. To provide for that guiding element which is adjacent the right-shown extremity of member 60, this locally thickened portion 80 may be cut away for a substantial distance downwardly from the top of the member to form a cut-out 81 similar to the cut-out 31, and from the portion 80 therebelow a vertical pin 82 may extend for a short distance upwardly in full analogy to the pin 32 in cut-out 31; on this pin there may be journalled a guiding roller 83 analogous to the guiding roller 33. A biasing roller 84, analogous to 34, may be provided for in manner analogous to that above detailed for 34, the parts being in each instance identified by a number greater by 50 than the parts above described for 34.

For predetermining the orientations, transverse to the track, of both of the members 20 and 60 there may be provided, in transverse alignment with one of the guiding elements (for example, 33) but located at a different distance from the bearing surface 2, an orienting roller and an associated biasing roller. For this purpose the lower one of the locally thickened portions 30 may be cut away from the bottom of the member 20 for a substantial distance upwardly to form a cut-out 51, and from the portion 30 thereabove there may extend for a short distance downwardly into that cut-out a vertical pin 52 on which may be journalled an orienting roller 53 analogous to the guiding roller 33. A biasing roller 54 analogous to 34 may be provided in manner analogous (other than for reversal between up and down) to that above described for 34, the parts being in each instance identified by a number greater by 20 than those above described for 34.

Each of the two bearing rollers and each of the other eight rollers above described, all of which latter may be of the same diameter, may desirably be at least minutely crowned, so as to reduce substantially to a point or very short transverse line its actual contact at any instant with the bearing or guiding surface (2, 3 or 4) with which it co-acts.

With respect to each of the pairs of rollers 33–34, 43–44, 83–84 and 53–54 it will be appreciated that the lower-numbered roller of the pair, having its axis fixed with respect to its respective member, performs the guiding function proper, the higher-numbered roller in each instance performing the auxiliary function of biasing the respective lower-numbered roller into contact with the track's guiding surface 3. In this connection it will also be appreciated that curvature of the path of the track surface 2 will slightly increase the separation between the respective points or short transverse lines of contact of the two rollers with the respective track surfaces 3 and 4— but that accommodation to such increase, as well as to variations in the track thickness, will be automatically achieved by reason of the biased and therefore yieldable support of the higher-numbered roller of each pair. With respect to that pair of rollers, 43–44, which is adjacent the interconnected member extremities it will be noted that the guiding roller of the pair, or 43, is coaxial with the pivotal interconnection of the members—an arrangement strongly preferred.

As indicated, it is desirable that in the movement of the train along the track the periphery of each of the rollers 25 and 65 proceeds smoothly along the track, without appreciable transverse "jumps" or "jerks" such as would result from an improvident orientation of its axis of rotation. In order that this desideratum always be substantially fully achieved in spite of curvature of the path of the track's surface 2, I maintain that axis (of each independent one of those two rollers) substantially normal to the projection (at right angles to the plane along which the surface 2 extends) of that path. I do this by positioning each of those axes at approximately the longitudinal mid-point of the respective member, and more specifically by positioning it at substantially the longitudinal mid-point between the guiding roller 43 and the other guiding roller (either 33 or 83) associated with that member; by fixing the axis of each of those rollers in the respective member, and more specifically by fixing it at right angles thereto; and by providing member-guiding means which appropriately establish the positions of the extremities of the two members in the plane along which the track surface 2 extends, such last-mentioned means being typically those already described (e.g., the group of guiding elements 33, 43 and 83).

In obedience to the foregoing there is provided at the top of the member 20, mid-way between the rollers 33 and 43, a boss 23 extending toward the track, establishment of the boss at a proper elevation being facilitated without need for excessive height of the entire member by causing the boss to extend partially from a central lug 22 which itself extends upwardly from that member; in the boss there is secured a relatively thick pin 24 which extends from the boss over the track 1, at right angles to the member 20, and it is on that pin 24 that the roller 25 is journalled. Similarly there is provided at the top of the member 60, mid-way between the rollers 43 and 83, a boss 63 extending toward the track (the boss conveniently extending partially from a lug 62 which itself extends upwardly from that member); in the boss there is secured the relatively thick pin 64, and it is on that pin 64 that the roller 65 is journalled.

It is particularly to be noted that the preferred construction thus described wholly avoids any requirement whatever, in the connection of either bearing roller to its respective member, for a "caster" arrangement and thus altogether avoids the weaknesses to which such arrangements are prone.

When the plane along which the track surface 2 extends is a horizontal one or an inclined one not too far from horizontal, that surface may be made the top surface of the track (as illustrated) and then gravity, manifesting itself in the weight of the train and of the parts which will be attached thereto, will ordinarily be ample to insure the positive maintenance of the rollers 25 and 65 in contact with that track surface. In order, however, to insure maintenance of positive contact under other conditions (such as when that plane is a vertical or near-vertical one, with the bearing surfaces in any orientation), it is desirable to provide means independent of gravity for positively maintaining the bearing rollers 25 and 65 in that contact. Those means are illustrated in FIGURES 2 and 3.

Broadly those means comprise a roller 15 suitably carried by the train and arranged with its periphery adjacent to and biased against the surface 5 of the track (which when the track is disposed as illustrated is the bottom surface). As in the case of the rollers 25 and 65, it is desirable that the axis of this roller be maintained substantially normal to the projection (abovementioned) of the path of the track; at the same time it is desirable that this roller 15, in order that it may most effectively perform its basic function, occupy a position longitudinally of the train which is intermediate between the rollers 25 and 65, thus ruling out a choice for it of a position in transverse alignment with either of those rollers. To achieve both of those desiderata, I provide in the train a supplementary member 10 which is in straddling relationship to the axis of pivotal interconnection of the members 20 and 60 and whose angles of deviation from alignment with the respective members 20 and 60 (resulting from curvature of the track path) will always be essentially equal to each other and to half the angle of deviation of either of those members from alignment with the other; the roller 15 is then journalled on a transverse pin 14 fixed to and extending at right angles from the approximate mid-point (longitudinally) of that supplementary member, being thus substantially in transverse alignment with and adjacent to the axis of pivotal interconnection of members 20 and 60. In order that the proper angular relationships just mentioned be maintained the spacing between the rollers 83 and 43 should be essentially equal to that between the rollers 43 and 33, as is in any event preferred and has been illustrated.

Figure 2:
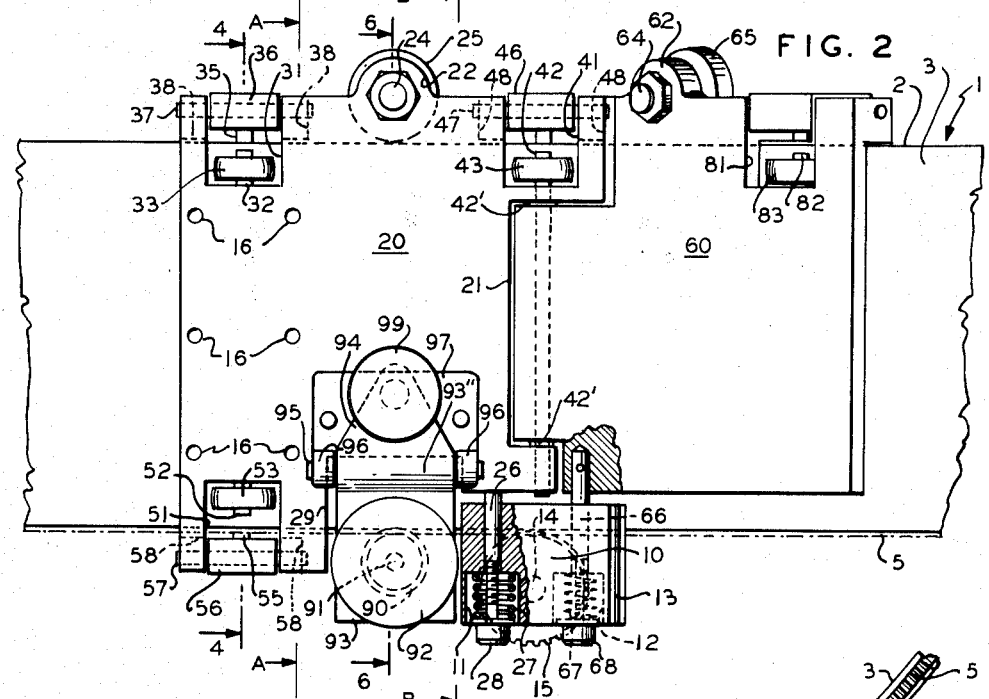
FIGURE 2 is a front elevational view of the track and train of FIGURE 1, showing the train-propelling motor and its mounting, but omitting the abovementioned plate and the torch-mounting means and torch (and also certain roller-biasing means elsewhere shown)
Figure 3:
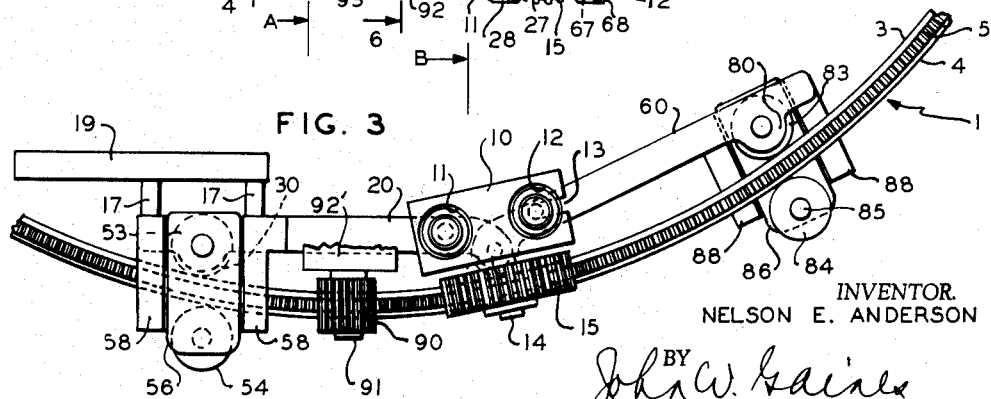
FIGURE 3 is a view analogous to FIGURE 1 excepting that it shows the bottom of the track and train, omitting most of the elements above the mid-level of FIGURE 2 as well as the motor and its mounting means.

To provide for the mounting of the supplementary member 10 the right-shown portion of the member 20 and the entirety of the member 60 may be limited in their extents toward the level of the track surface 5 to a little short of that level (as seen in FIGURE 2), and the gap between the lower marginal portions of the members 20 and 60 may be made to lie relatively close to the inter-member pivoting pin 42. Fixed in and extending downwardly from each of those lower marginal portions, at respective distances from the pin 42 which are equal to each other, are respective studs 26 and 66. The supplementary member 10, which may be a moderately thick rectangular plate disposed (when the plane along which the track surface 2 extends is horizontal) in a vertical plane, may have one of its end portions pivoted on one of those studs (for example, its left-shown end portion pivoted on the stud 26), and in its other end portion may be bifurcated by a slot 13 parallel with that member itself and in which the other stud (e.g., 66) just freely fits. The supplementary member 10 is thus pivotally connected to one, and both pivotably and slidably connected to the other, of the members 20 and 60. In order to provide for an upward bias of the supplementary member 10 (and thus of the periphery of the roller 15 against the track surface 5) the lower portion of that member may be provided with bores 11 and 12, the former coaxial with the stud 26 and the latter coaxial with the average position of the stud 66 within the slot 13, and respective coil spring 27 and 67 may be compressed within those bores by respective large-headed screws 28 and 68 screwed upwardly into the respective studs 26 and 66.

The welding torch, designated as 100, is mounted to one of the members of the train, preferably the member 20, to facilitate which there may be provided in that member an appropriate vertical mounting plate 19; this plate may be secured in any convenient place in that member, for example at and leftwardly overhanging from that member's left-shown portion. For this purpose, by way of example, screw holes 16 are shown in FIGURE 2 in that portion of 20, and the plate 19 (as seen in FIGURES 1 and 4) may be mounted by means of screws 18 passing therethrough and through spacing pillars 17 into those holes.

Figure 1:
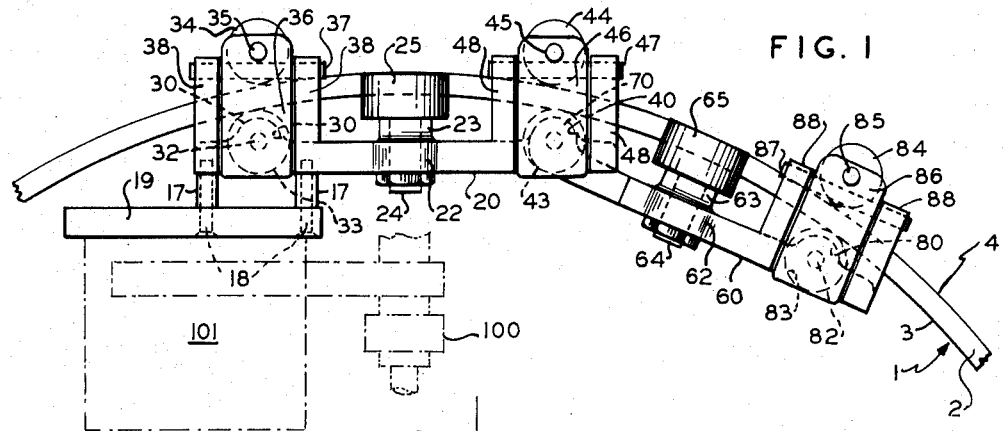
FIGURE 1 is a top view of a track and of a train according to the invention adapted to be propelled along the track and to carry a welding torch, showing in full the plate to which the torch may be mounted, but showing only schematically portions of the torch-mounting means and of the torch and omitting elements lying below the mid-level of FIGURE 2.

The torch itself appears in FIGURE 4 and fractionally in FIGURE 1. It may be mounted to the plate 19 through a mounting system 101 indicated only schematically in the drawings (FIGURES 1 and 4)—it being understood that that system may if desired comprise remotely controllable means for moving the torch toward and away from the train, moving it toward and away from the work W, angling it with respect to the work surface and/or otherwise manipulating it, such means themselves, however, forming no part of the present invention and therefore not being herein detailed. As indicated in FIGURE 1 for the case wherein the torch axis is normal to the projection of the path of the track surface 2 and thus to the work, the torch will preferably be positioned longitudinally of the member 20 so that the region of contact of its projected flame with the work will be transversely aligned with the longitudinal center of the member 20 (i.e., with the roller 25) in order to maintain essentially unchanged, in spite of work-surface and path curvature, the angle of incidence of the flame onto the work.

Figure 5:
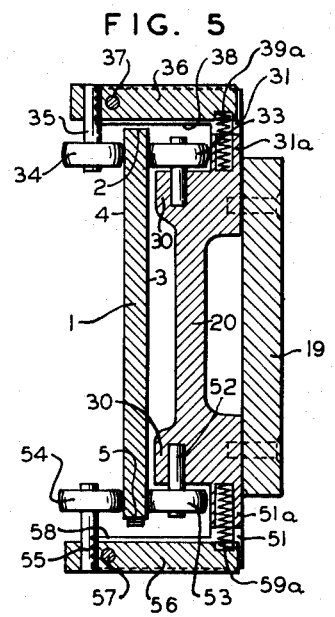
FIGURE 5 is a cross-sectional view, alternative to the central portion of FIGURE 4, illustrating certain optional modifications in respect principally of the arrangements for mounting and biasing the biasing rollers.

In connection particularly with the arrangements for supporting those rollers (i.e., the biasing rollers) which engage the track surface 4, a construction slightly modified from that above described has been illustrated in FIGURE 5. In this modified construction (which is illustrated specifically for the rollers 34 and 54 and will be described simply in connection therewith, but is obviously available for the rollers 44 and 84 as well) the member 20, around each of the cut-outs 31 and 51, is locally thickened forwardly (i.e., away from the track), and in front of the rollers 33 and 53, across the lower portion of cut-out 31 and the upper portion of cut-out 51, there are formed respective aprons 31a and 51a of moderate thickness; the levers 36 and 56 are extended forwardly to over and under these aprons respectively. The biasing springs 39 and 59 of FIGURE 4 are then replaced by biasing springs 39a and 59a inset into appropriate bores in these respective aprons and extending therefrom into contact with the respective levers. The thus-modified construction, which among others has the advantage of shielding the rollers 33 and 53 from the front, is one easily effected if the members 20 and 60 be formed by casting (with subsequent machining where necessary), which may in any event be most convenient. With this construction the plate 19 may be directly secured to the forwardly-extended portions of the member 20, as shown in FIGURE 5.

To provide for the propulsion of the train and torch along the track one of the track surfaces may be provided with teeth, thereby forming it into a rack; preferably that surface will be the surface 5—it being understood that then the roller 15 above described will take the form of an idling pinion fitting the rack. The propelling means itself may be a driving pinion 90 fitting the rack and fastened on the shaft 91 of a motor 92, that motor being held in the train with its shaft disposed generally parallel with the plane along which the track surface 2 extends (in the illustrated embodiment, horizontal) and maintained substantially normal to the projection above-mentioned) of that track surface. To achieve the last-mentioned specification the motor may for example be held in the member 20 with its shaft 91 parallel to and transversely aligned with (in the illustrated embodiment, directly below) the pin 24 on which the bearing roller 25 is journalled, thereby causing the pinion 90 to be related to the track surface 5 in the same beneficial manner as that (described in detail above) in which the roller 25 is related to the track surface 2—a result of especial importance in the case of the pinion 90, in view of the necessity for maintaining a proper relationship between its teeth and those of the rack formed in the surface 5.

Figure 6:
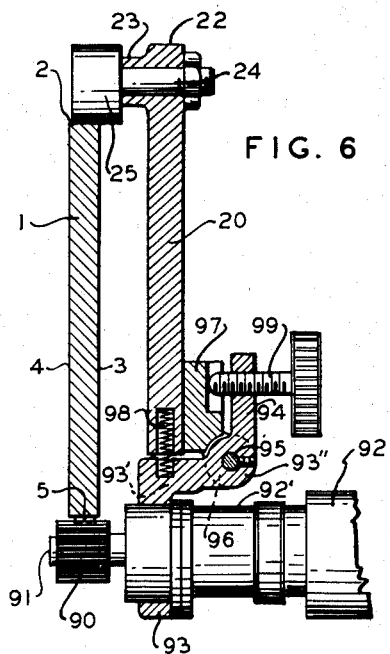
FIGURE 6 is a cross-sectional view taken along the vertical line 6—6 of FIGURE 2, omitting elements to the right of the line B—B of that figure.

In mounting the motor in the member 20 it is desirable to provide both for rather fine adjustment of the degree of engagement of the pinion 90 with the rack 5 and for the disengagement, or "declutching," of that pinion from that rack when desired. For these purposes the central lower portion of the member 20 itself may be cut away (as indicated at 29 in FIGURE 2) and replaced by an adjustable motor-mounting plate 93 (seen in FIGURES 2 and 6) in which the reducing-gear portion or neck 92' of the motor may be secured in any convenient manner, with the motor extending forwardly from that plate and its shaft and the pinion 90 extending rearwardly therefrom to underneath the rack 5.

Above the motor the motor-mounting plate may have a short forwardly-extending portion 93' the front part of which may form a hub 93'', and from that hub upwardly a lever portion 94, for example of generally triangular elevation. The hub 93'' may be journalled on a suitable pin 95 which extends horizontally between two lugs 96 formed forwardly and downwardly from the left- and right-shown lower corners of a bracket 97 secured to the front of the member 20 above the cut-out 22. A compression spring 98 whose lower portion is confined in an appropriate bore in the top of the plate portion 93' and whose upper portion is confined in an aligned bore in the bottom surface of the member 20 may bias the motor-mounting plate 93 toward disengagement of the pinion 90 from the rack 5. A knurled-knob adjusting screw 99 threaded through the upper part of the lever portion 94 into abutment against the bracket 97 may serve to move the plate 93 against its bias to result in any desired degree of engagement of pinion with rack.

It will, of course, be understood that while for most purposes there will be desired the motor-effected propulsion of the train along the track, the train may alternatively be subjected to propulsion by power otherwise (for example manually) applied to it. It will accordingly be understood that not all of the aspects of the invention are limited to the inclusion of the motor-driven pinion 90 or the like.

With the structure as thus disclosed, having a distance between rollers 43 and 33 and a distance between rollers 83 and 43 each about 4½″, I have been able to achieve wholly satisfactory motor-driven operation on a track having a path comprising curves, both convex and concave, of as little as 12″ radius—a very high degree of curvature indeed for apparatus of this character.

While I have disclosed my invention in terms of a specific embodiment thereof, it will be understood that I intend thereby no unnecessary limitations. Modifications in many respects will be suggested by my disclosure to those skilled in the art, and such modifications will not necessarily constitute departures from the spirit of the invention or from its scope, which I undertake to define in the following claims.

I claim:

1. In a welding apparatus for transporting a welding torch along a track, the combination of a track having a bearing surface which lies generally along a plane, at least parts of the path of the track along said plane and of the projection of that path at right angles to said plane being curved, a train adapted for carrying a welding torch and arranged for travel along the track, said train comprising two members having mutually adjacent extremities pivotally interconnected on an axis generally normal to said plane, each of which members includes a respective bearing roller which is journalled on a transverse axis fixed in that member and generally parallel with said plane, and each of which said bearing rollers peripherally bearing on said bearing surface, a guiding surface as a part of said track generally at right angles to said bearing surface, member guiding means independent of said bearing rollers for maintaining the axis of each of said bearing rollers substantially normal to said path projection, said member guiding means comprising three guiding elements engaging said guiding surface and held in said train respectively adjacent said pivotally interconnected extremities and adjacent each of the other extremities of said members.

2. The subject matter claimed in claim 1 wherein each of said bearing rollers is longitudinally positioned substantially mid-way between the longitudinal positions of a respective two of said guiding elements.

3. The subject matter claimed in claim 1 wherein said guiding element adjacent said pivotally interconnected member extremities comprises a guiding roller journalled on said axis of pivotal interconnection.

4. In welding apparatus for carrying a welding torch along a track, the combination of a track having a bearing surface which lies generally along a plane, at least parts of the path of the track along said plane and of the projection of that path at right angles to said plane being curved, a train adapted for carrying a welding torch and arranged for travel along the track, said train comprising two members having mutually adjacent extremities pivotally interconnected on an axis generally normal to said plane, each of said members including a respective bearing roller which is journalled on a transverse axis fixed in that member and generally parallel with said plane and which peripherally bears on said bearing surface, track-engaging means carried by the train and rotatable about a transverse axis to propel the train along the track, and member-guiding means maintaining the axes of said bearing rollers and of said track-engaging means each substantially normal to said path projection.

5. The subject matter claimed in claim 4 to wherein said track-engaging means is carried by one of said members with its axis parallel with the axis of the respective bearing roller.

6. The subject matter claimed in claim 5 wherein said track comprises a guiding surface generally at right angles to said bearing surface and wherein said member-guiding means comprises three guiding elements engaging said guiding surface and held in the train respectively adjacent said pivotally interconnected extremities and adjacent each of the other extremities of said members.

7. The subject matter claimed in claim 6 wherein each of said bearing rollers is longitudinally positioned substantially mid-way between the longitudinal positions of a respective two of said guiding elements.

8. In welding apparatus for carrying a welding torch along a track, the combination of a track having a bearing surface which lies generally along a plane, at least parts of the path of the track along said plane and of the projection of that path at right angles to said plane being curved, and having an opposite surface, a train adapted for carrying a welding torch and arranged for travel along the track, said train comprising two members having mutually adjacent extremities pivotally interconnected on an axis generally normal to said plane and being provided with a plurality of longitudinally spaced bearing means bearing on said bearing surface, a roller for contacting the track on said opposite surface, and means, longitudinally positioned intermediately between the longitudinal positions of two of said bearing means, supporting the roller in the train with its axis generally parallel with said plane and substantially normal to said path projection.

9. The subject matter claimed in claim 8 wherein said opposite surface comprises a rack and wherein said roller comprises a pinion engaging said rack.

10. The subject matter claimed in claim 8 wherein said supporting means comprises a supplementary member connected between said two members in straddling relationship to said axis of pivotal interconnection.

11. The subject matter claimed in claim 10 wherein said supplementary member is pivotally connected to one, and both pivotally and slidably connected to the other, of said two members.

12. In welding apparatus for carrying a welding torch along a track, the combination of a track having a bearing surface which lies generally along a plane, at least parts of the path of the track along said plane being curved, and having an opposite surface, a train adapted for carrying a welding torch and arranged for travel along the track, said train comprising two members having mutually adjacent extremities pivotally interconnected on an axis generally normal to said plane and being provided with a plurality of longitudially spaced means bearing on said bearing surface, a supplementary member connected between said two members in straddling relationship to said axis of pivotal interconnection, and means carried by said supplementary member and engaging said opposite surface for positively maintaining the bearing of said first-mentioned means on said bearing surface.

13. A welding torch carrying apparatus for transporting a torch along a path comprising a combination of a track having a bearing surface which lies generally along a plane, a guiding surface at right angles to said bearing surface, and a surface opposite said bearing surface, at least parts of the path of the track along said plane and of the projection of that path at right angles to said plane being curved, a train adapted for carrying a welding torch and arranged for travel along the track, said train comprising two members having mutually adjacent ends pivotally interconnected on an axis generally normal to said plane, each of said members including a bearing roller, which roller is connected to its respective member on an axis which is generally normal to said curved projection, guiding means on said train for maintaining the bearing roller axis normal to said projection, said guiding means comprising rollers in contact with said guiding surface, one such guiding roller positioned immediately adjacent the pivoted extremities of said members, and one guiding roller at the opposite extremities of each member, additional means mounted on said train at a point which is substantially at the pivotal connection between said members, said additional means contacting said opposite side of the track whereby the train is positively held on the track by the combined action of the bearing roller means, the guiding means, and said additional means.

References Cited by the Examiner

UNITED STATES PATENTS

| | | | |
|---|---|---|---|
| 616,813 | 12/1898 | Sumner | 105—155 |
| 1,973,927 | 9/1934 | Motley | 105—153 |
| 2,412,598 | 12/1946 | Brush | 105—153 |
| 2,737,565 | 3/1956 | Meyer | 113—134 |
| 2,752,468 | 6/1956 | Costello | 219—126 |
| 2,781,441 | 2/1957 | Ballentine et al. | 219—126 |
| 2,806,935 | 9/1957 | Meyer | 219—126 |
| 2,972,042 | 2/1961 | Ashbaker | 219—126 |

CHARLES W. LANHAM, *Primary Examiner.*